(12) United States Patent
Ozawa

(10) Patent No.: US 11,158,196 B2
(45) Date of Patent: Oct. 26, 2021

(54) FLIGHT PLAN CHANGING METHOD AND FLIGHT PLAN CHANGING APPARATUS

(71) Applicant: ALPINE ELECTRONICS, INC., Tokyo (JP)

(72) Inventor: Minoru Ozawa, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 222 days.

(21) Appl. No.: 16/267,614

(22) Filed: Feb. 5, 2019

(65) Prior Publication Data

US 2019/0287411 A1  Sep. 19, 2019

(30) Foreign Application Priority Data

Mar. 13, 2018 (JP) .............................. JP2018-045330

(51) Int. Cl.
*G08G 5/00* (2006.01)
*B64C 39/02* (2006.01)
*G05D 1/00* (2006.01)
*G05D 1/10* (2006.01)

(52) U.S. Cl.
CPC ......... *G08G 5/0039* (2013.01); *B64C 39/024* (2013.01); *G05D 1/0094* (2013.01); *G05D 1/101* (2013.01); *G08G 5/0069* (2013.01); *B64C 2201/127* (2013.01)

(58) Field of Classification Search
CPC ............ B64C 2201/127; B64C 39/024; G08G 5/0039; G05D 1/101; G05D 1/0069; G05D 1/0094
See application file for complete search history.

(56) References Cited

U.S. PATENT DOCUMENTS

| | | | |
|---|---|---|---|
| 2014/0303814 A1* | 10/2014 | Burema | A01B 79/005 701/3 |
| 2017/0083027 A1 | 3/2017 | Tao et al. | |
| 2017/0278271 A1 | 9/2017 | Nonaka et al. | |
| 2018/0002010 A1* | 1/2018 | Bauer | B64C 39/024 |
| 2018/0122246 A1* | 5/2018 | Clark | G06K 9/0063 |
| 2018/0204469 A1* | 7/2018 | Moster | B64C 39/024 |
| 2018/0357909 A1* | 12/2018 | Eyhorn | G08G 5/0013 |
| 2020/0019189 A1* | 1/2020 | Chen | G08G 5/045 |

(Continued)

FOREIGN PATENT DOCUMENTS

| | | |
|---|---|---|
| JP | 2014-076676 | 5/2014 |
| JP | 6124384 | 5/2017 |

(Continued)

OTHER PUBLICATIONS

Japanese Office Action for 2018-045330 dated May 18, 2021.

*Primary Examiner* — Peter D Nolan
*Assistant Examiner* — Kenneth M Dunne
(74) *Attorney, Agent, or Firm* — IPUSA, PLLC

(57) ABSTRACT

A flight plan changing method performed by an apparatus includes reading a flight log of an unmanned aircraft that flies flight routes connecting multiple way points included in a flight plan and captures image data of an object located between the way points; identifying, based on the flight log, coordinates of a position of the unmanned aircraft at which the capturing of the image data of the object is interrupted; and generating a changed flight plan including way points that are newly determined based on the identified coordinates of the position.

3 Claims, 13 Drawing Sheets

(56) References Cited

U.S. PATENT DOCUMENTS

| | | | | |
|---|---|---|---|---|
| 2020/0033890 A1* | 1/2020 | Sugaki | ............... | G05D 1/0088 |
| 2020/0051443 A1* | 2/2020 | Zhao | ................... | G08G 5/006 |
| 2020/0388169 A1* | 12/2020 | Barr | ..................... | G08G 5/045 |
| 2021/0126582 A1* | 4/2021 | Shue | ..................... | G01M 5/005 |
| 2021/0173414 A1* | 6/2021 | Starr | ..................... | B64F 1/362 |

FOREIGN PATENT DOCUMENTS

| | | |
|---|---|---|
| JP | 2017-175517 | 9/2017 |
| KR | 10-1827251 | 2/2018 |
| WO | 2015/180133 | 12/2015 |

* cited by examiner

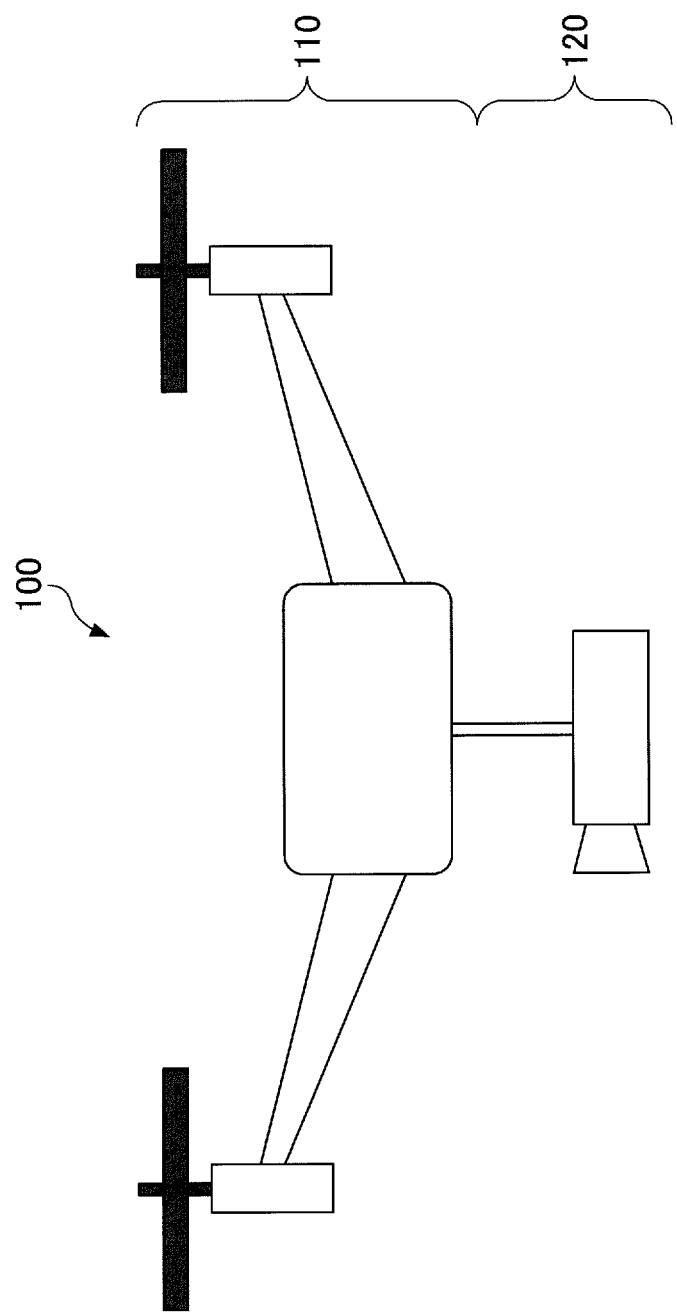

| POINT | LATITUDE, LONGITUDE, ALTITUDE |
|---|---|
| HP | La1, Lo1, Al1 |
| WP1 | La11, Lo11, Al11 |
| WP2 | La21, Lo21, Al21 |
| WP3 | La31, Lo31, Al31 |
| WP4 | La41, Lo41, Al41 |
| HP | La1, Lo1, Al1 |

FIG.6

| POINT | TIME | LATITUDE, LONGITUDE, ALTITUDE | POWER | IMAGE DATA |
|---|---|---|---|---|
| HP | *** O'CLOCK *** MIN. *** SEC. | La1, Lo1, Al1 | ◎ | |
| | *** O'CLOCK *** MIN. *** SEC. | La2, Lo2, Al2 | ◎ | |
| | ⋮ | ⋮ | ⋮ | |
| WP1 | *** O'CLOCK *** MIN. *** SEC. | La11, Lo11, Al11 | ◎ | IM1 |
| | *** O'CLOCK *** MIN. *** SEC. | La12, Lo12, Al12 | ◎ | |
| | ⋮ | ⋮ | ⋮ | |
| WP2 | *** O'CLOCK *** MIN. *** SEC. | La21, Lo21, Al21 | ○ | |
| | *** O'CLOCK *** MIN. *** SEC. | La22, Lo22, Al22 | ○ | |
| | ⋮ | ⋮ | ⋮ | |
| WP3 | *** O'CLOCK *** MIN. *** SEC. | La31, Lo31, Al31 | △ | |
| | *** O'CLOCK *** MIN. *** SEC. | La32, Lo32, Al32 | △ | |
| | ⋮ | ⋮ | ⋮ | |
| | *** O'CLOCK *** MIN. *** SEC. | La100, Lo100, Al100 | × | |
| | ⋮ | ⋮ | ⋮ | |
| HP | *** O'CLOCK *** MIN. *** SEC. | La1, Lo1, Al1 | × | — |

600

| POINT | LATITUDE, LONGITUDE, ALTITUDE |
|---|---|
| HP | La1, Lo1, Al1 |
| WP3' | La3'1, Lo3'1, Al3'1 |
| WP3 | La31, Lo31, Al31 |
| WP4 | La41, Lo41, Al41 |
| WP5 | La51, Lo51, Al51 |
| HP | La1, Lo1, Al1 |

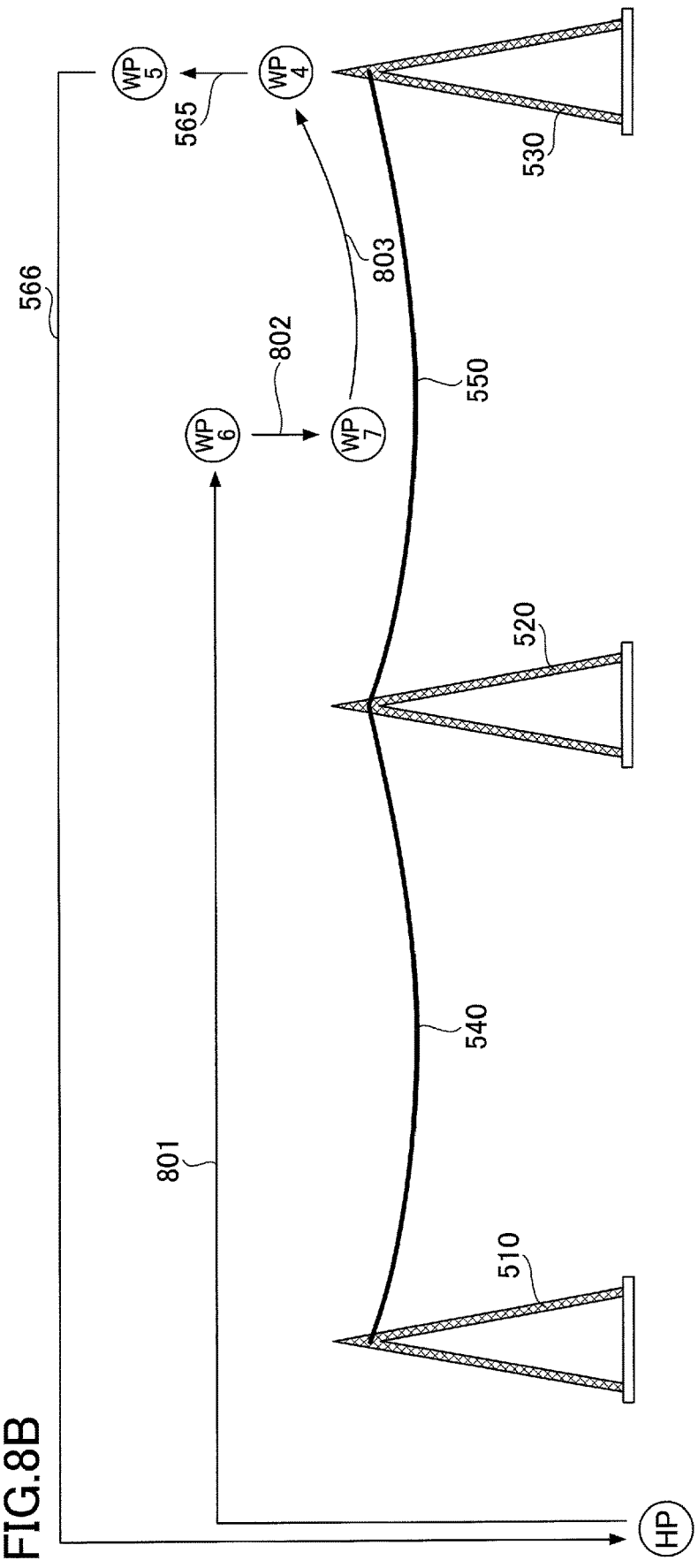

FIG.12

| POINT | TIME | LATITUDE, LONGITUDE, ALTITUDE | POWER | IMAGE DATA |
|---|---|---|---|---|
| HP | *** O'CLOCK *** MIN. *** SEC. | La1, Lo1, Al1 | ◎ | IM2 |
|  | *** O'CLOCK *** MIN. *** SEC. | La2, Lo2, Al2 | ◎ |  |
|  | ⋮ | ⋮ | ⋮ |  |
| WP6 | *** O'CLOCK *** MIN. *** SEC. | La61, Lo61, Al61 | ◎ |  |
|  | *** O'CLOCK *** MIN. *** SEC. | La62, Lo62, Al62 | ◎ |  |
|  | ⋮ | ⋮ | ⋮ |  |
| WP7 | *** O'CLOCK *** MIN. *** SEC. | La100, Lo100, Al100 | ◎ |  |
|  | *** O'CLOCK *** MIN. *** SEC. | La72, Lo72, Al72 | ◎ |  |
|  | ⋮ | ⋮ | ⋮ |  |
| WP4 | *** O'CLOCK *** MIN. *** SEC. | La41, Lo41, Al41 | ◎ |  |
|  | *** O'CLOCK *** MIN. *** SEC. | La42, Lo42, Al42 | ◎ |  |
|  | ⋮ | ⋮ | ⋮ |  |
| WP5 | *** O'CLOCK *** MIN. *** SEC. | La51, Lo51, Al51 | ◎ |  |
|  | *** O'CLOCK *** MIN. *** SEC. | La52, Lo52, Al52 | ◎ |  |
|  | ⋮ | ⋮ | ⋮ |  |
| HP | *** O'CLOCK *** MIN. *** SEC. | La1, Lo1, Al1 | ◎ |  |

1200

FLIGHT PLAN CHANGING METHOD AND FLIGHT PLAN CHANGING APPARATUS

CROSS-REFERENCE TO RELATED APPLICATION

The present application is based upon and claims priority to Japanese Patent Application No. 2018-045330, filed on Mar. 13, 2018, the entire contents of which are incorporated herein by reference.

BACKGROUND OF THE INVENTION

1. Field of the Invention

An aspect of this disclosure relates to a flight plan changing method and a flight plan changing apparatus.

2. Description of the Related Art

There is a known inspection method where an object at a high altitude (e.g., a power line stretched between pylons) is inspected by capturing image data of the object using an unmanned aircraft such as a drone equipped with an imaging device. In such an inspection method, a flight plan including multiple way points is generated, and image data of the object is captured by automatically flying the unmanned aircraft along the object according to a flight route connecting the way points (see, for example, WO 2015/180133).

However, the flight distance between way points and the power consumption during flight may increase depending on the shape of an object whose image data is captured. Also, the power consumption during the flight may increase due to the influence of natural phenomena (e.g., wind and rain). As a result, the remaining battery power may become less than or equal to a predetermined value during the flight, and the flight according to the flight plan may be interrupted as a failsafe operation.

In the related-art technology, if the flight according to the flight plan is interrupted, a changed flight plan including way points before and after a position at which the flight is interrupted and unflown way points (way points to which the unmanned aircraft has not flown) is generated. With the changed flight plan, image data of the same portion of the object is repeatedly captured. Accordingly, compared with a case where the flight plan is not interrupted, the amount of captured image data increases, the time necessary to analyze the image data increases, and the inspection efficiency decreases.

SUMMARY OF THE INVENTION

In an aspect of this disclosure, there is provided a flight plan changing method performed by an apparatus. The flight plan changing method includes reading a flight log of an unmanned aircraft that flies flight routes connecting multiple way points included in a flight plan and captures image data of an object located between the way points; identifying, based on the flight log, coordinates of a position of the unmanned aircraft at which the capturing of the image data of the object is interrupted; and generating a changed flight plan including way points that are newly determined based on the identified coordinates of the position.

BRIEF DESCRIPTION OF THE DRAWINGS

FIG. 1A is a drawing illustrating an example of an external configuration of an unmanned aircraft;

FIG. 6 is a table indicating an example of a flight log of a flight according to a flight plan that is interrupted;

FIG. 8A is a table indicating an example of a changed flight plan generated according to a flight plan changing method of a first embodiment;

FIG. 8B is a drawing illustrating way points and flight routes based on the flight plan of FIG. 8A;

FIG. 12 is a table indicating an example of a flight log of a flight according to a changed flight plan.

DESCRIPTION OF THE PREFERRED EMBODIMENTS

An aspect of this disclosure provides a flight plan changing method and a flight plan changing apparatus that can improve inspection efficiency.

Embodiments of the present invention are described below with reference to the accompanying drawings. Throughout the specification and the drawings, the same reference number is assigned to components having substantially the same function and configuration, and repeated description of those components is omitted.

First Embodiment

<External Configuration and Functional Configuration of Unmanned Aircraft>

Figure 1B:
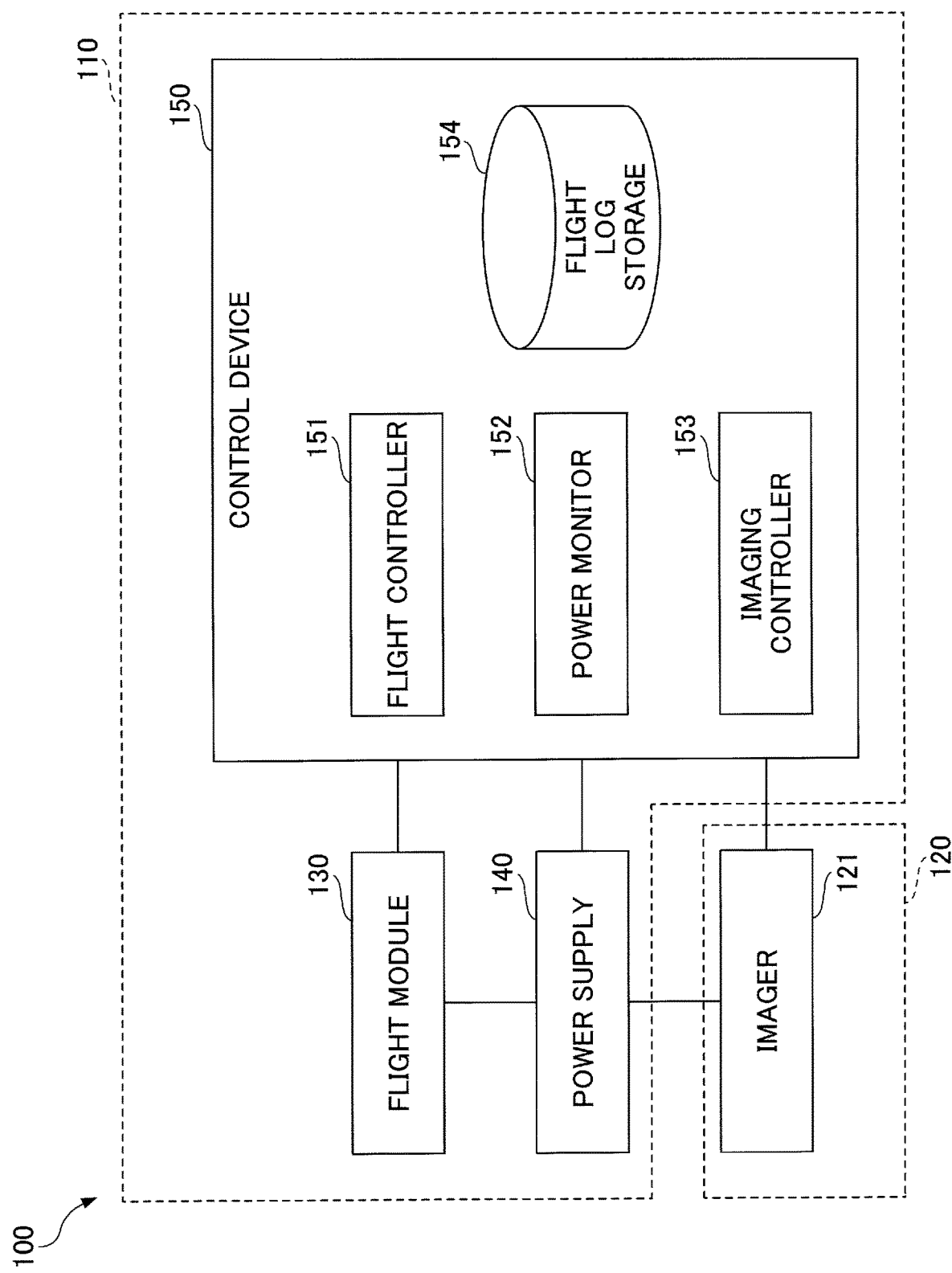
FIG. 1B is a block diagram illustrating an example of a functional configuration of the unmanned aircraft.

First, an unmanned aircraft (e.g., a drone) used to inspect an object (in an example of a first embodiment, a power line stretched between pylons) is described. FIG. 1A is a drawing illustrating an example of an external configuration of an unmanned aircraft 100, and FIG. 1B is a drawing illustrating an example of a functional configuration of the unmanned aircraft 100. As illustrated in FIG. 1A, the unmanned aircraft 100 includes an aircraft body 110 and an attachment 120. Also, as illustrated in FIG. 1B, the aircraft body 110 includes a flight module 130, a power supply 140, and a control device 150; and the attachment 120 includes an imager 121.

The flight module 130 includes a mechanism (e.g., propellers and motors) that enables the unmanned aircraft 100 to fly. The power supply 140 includes a power source (e.g., a battery) for supplying power to the flight module 130 and the imager 121.

The control device 150 controls the flight module 130 and the power supply 140 of the aircraft body 110 and the imager 121 of the attachment 120. A control program is installed in the control device 150 and is executed to cause the control device 150 to function as a flight controller 151, a power monitor 152, and an imaging controller 153.

The flight controller 151 controls the flight module 130 such that the unmanned aircraft 100 flies flight routes connecting multiple way points included in a set flight plan. More specifically, the flight controller 151 controls the flight module 130 such that the unmanned aircraft 100 flies a flight route between way points at a constant distance from a power line that is an object to be inspected. Also, when a failsafe operation is requested by the power monitor 152, the flight controller 151 interrupts a flight according to a set flight plan, and controls the flight module 130 to cause the unmanned aircraft 100 to return to a home position (HP). Further, the flight controller 151 obtains the coordinates (latitude, longitude, and altitude) of positions of the unmanned aircraft 100 during flight, and stores the coordinates in association with time information in a flight log storage 154.

The power monitor 152 monitors the amount of remaining power that can be supplied by the power supply 140, and stores information indicating the state of the power supply 140 in association with time information in the flight log storage 154. Also, when the amount of remaining power becomes less than or equal to a predetermined threshold, the power monitor 152 requests the flight controller 151 and the imaging controller 153 to perform a failsafe operation.

The imaging controller 153 controls the imager 121 to start and stop capturing image data, and stores the captured image data in association with time information in the flight log storage 154. The imaging controller 153 controls the imager 121 to start capturing image data when a flight starts, and controls the imager 121 to stop capturing image data when the flight ends. Also, when a failsafe operation is requested by the power monitor 152, the imaging controller 153 interrupts the capturing of image data by the imager 121. The imager 121 of the attachment 120 captures image data of an object under the control of the imaging controller 153. The imager 121 sends the captured image data to the imaging controller 153.

<Hardware Configuration of Control Device of Unmanned Aircraft>

Figure 2:
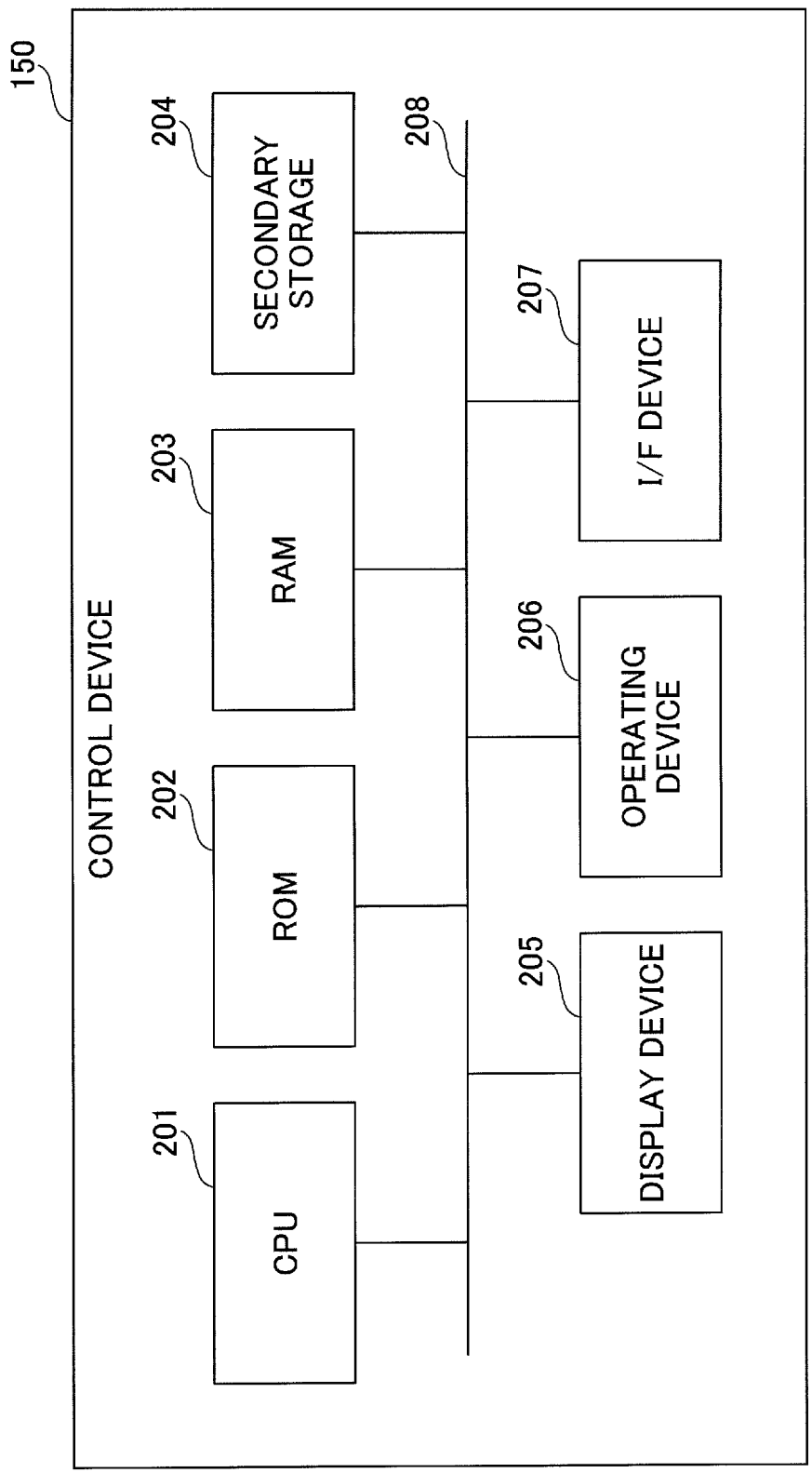
FIG. 2 is a block diagram illustrating an example of a hardware configuration of a control device of the unmanned aircraft.

Next, a hardware configuration of control device 150 of the unmanned aircraft 100 is described. FIG. 2 is a block diagram illustrating an example of a hardware configuration of the control device 150 of the unmanned aircraft 100. As illustrated in FIG. 2, the control device 150 includes a central processing unit (CPU) 201, a read-only memory (ROM) 202, a random access memory (RAM) 203, a secondary storage 204, a display device 205, an operating device 206, and an interface (I/F) device 207. These components of the control device 150 are connected to each other via a bus 208.

The CPU 201 executes various programs (e.g., a control program) installed in the secondary storage 204. The ROM 202 is a nonvolatile memory and functions as a main memory storing various programs and data that are necessary for the CPU 201 to execute the programs installed in the secondary storage 204. The RAM 203 is a volatile memory such as a dynamic random access memory (DRAM) or a static random access memory (SRAM). The RAM 203 functions as a main memory that provides a work area into which the programs installed in the secondary storage 204 are loaded when executed by the CPU 201.

The secondary storage 204 is a secondary memory that stores various programs and information used when the programs are executed. For example, the flight log storage 154 is implemented by the secondary storage 204.

The display device 205 is an output device that displays, for example, internal states of the control device 150. The operating device 206 is an input device for inputting various instructions to the control device 150. The I/F device 207 is a connection device for communications with a flight plan management apparatus (described later) that manages flight plans of the unmanned aircraft 100.

<Flight Plan>

Figures 3A, 3B:
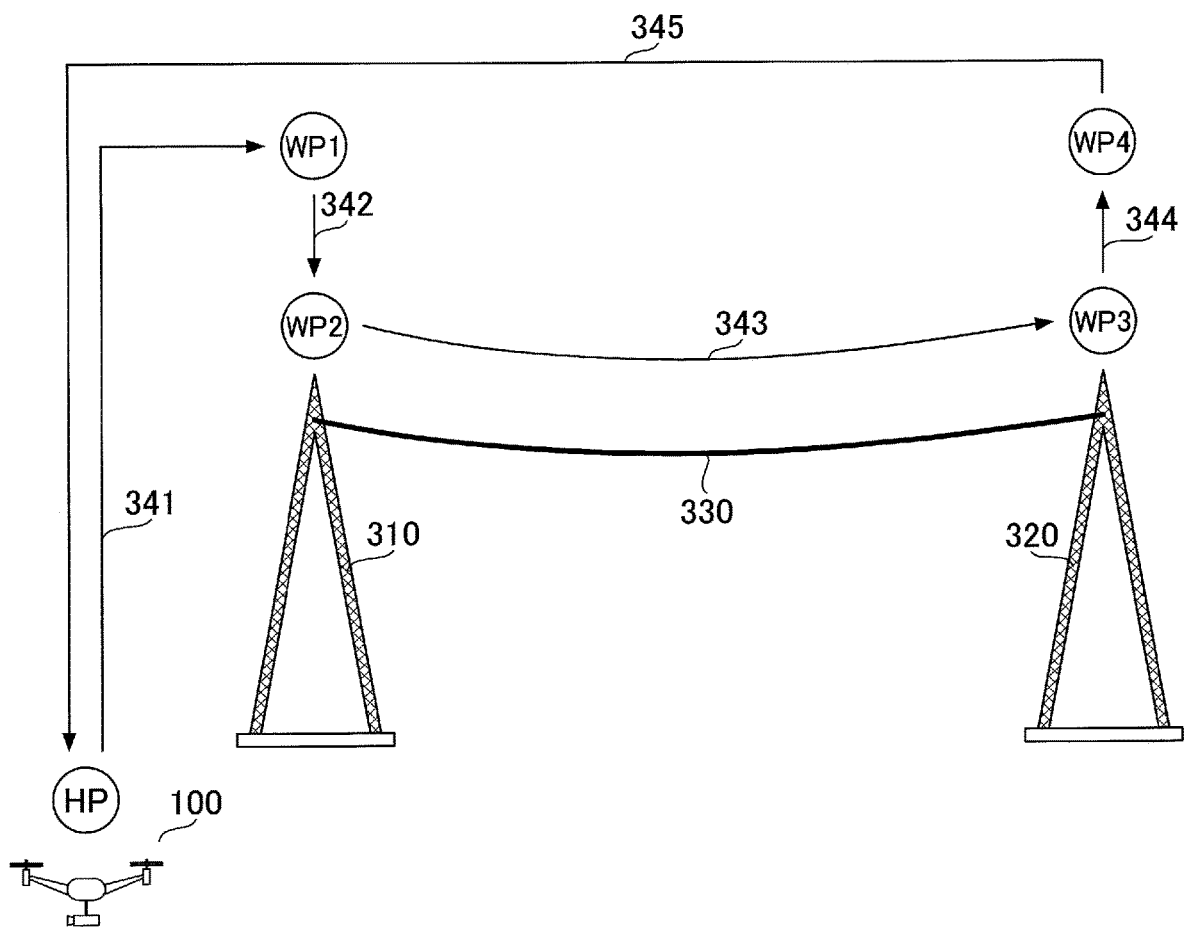
FIG. 3A is a table indicating an example of a flight plan.
FIG. 3B is a drawing illustrating way points and flight routes based on the flight plan of FIG. 3A.

Next, a flight plan set in the control device 150 of the unmanned aircraft 100 is described. FIG. 3A is a table indicating an exemplary flight plan 300. As illustrated in FIG. 3A, the flight plan 300 includes information items "point" and "latitude, longitude, altitude".

The "point" stores a home position (HP) and way points (WP) in flight order. The example of FIG. 3A indicates that the unmanned aircraft 100 plans to fly in the flight order of "HP→WP1→WP2→WP3→WP4→HP". The "latitude, longitude, altitude" stores information indicating the latitude, longitude, and altitude of each of the home position (HP) and the way points (WP).

FIG. 3B illustrates the positions of way points included in the flight plan 300 and flight routes based on the flight plan 300. In the example of FIG. 3B, WP1 is located above and at a predetermined distance from a pylon 310, and WP2 is located near the top of the pylon 310. Also in the example of FIG. 3B, WP3 is located near the top of a pylon 320, and WP4 is located above and at a predetermined distance from the pylon 320.

As illustrated in FIG. 3B, according to the flight plan 300, the unmanned aircraft 100 flies from HP to WP1 (flight route 341), and descends to WP2 (flight route 342). Then, the unmanned aircraft 100 flies between WP2 and WP3 at a constant distance from a power line 330 (flight route 343). After reaching WP3, the unmanned aircraft 100 ascends to WP4 (flight route 344) and returns from WP4 to HP (flight route 345).

<Cases where Flight Distance and Power Consumption Increase>

There are cases where a flight distance and power consumption of the unmanned aircraft 100 flying a flight route between way points included in the flight plan 300 increase. FIGS. 4A through 4D are drawings used to describe cases where a flight distance and power consumption increase.

Figure 4A:
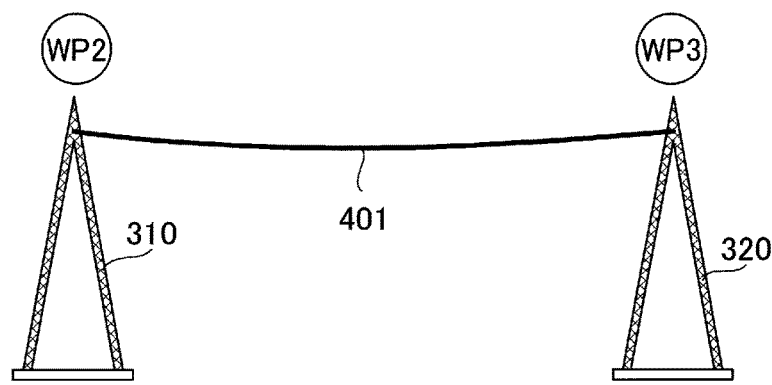
FIGS. 4A through 4D are drawings used to describe cases where a flight distance and power consumption increase.
Figure 4B:
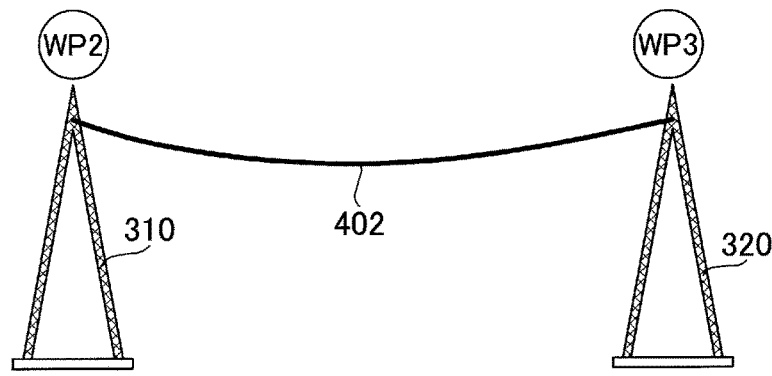

FIGS. 4A and 4B are used to describe a case where the flight distance between way points increases due to the shape of an object to be captured. In this case, although the distance between the pylon 310 and the pylon 320 in FIG. 4A is the same as that in FIG. 4B, power lines 401 and 402 stretched between the pylon 310 and the pylon 320 in FIGS. 4A and 4B have different shapes.

More specifically, compared with the power line 401 in FIG. 4A, the power line 402 in FIG. 4B has a more curved shape. As described above, the unmanned aircraft 100 flies between WP2 and WP3 at a constant distance from the power line. For this reason, the flight distance in FIG. 4B becomes greater than that in FIG. 4A.

Figure 4C:
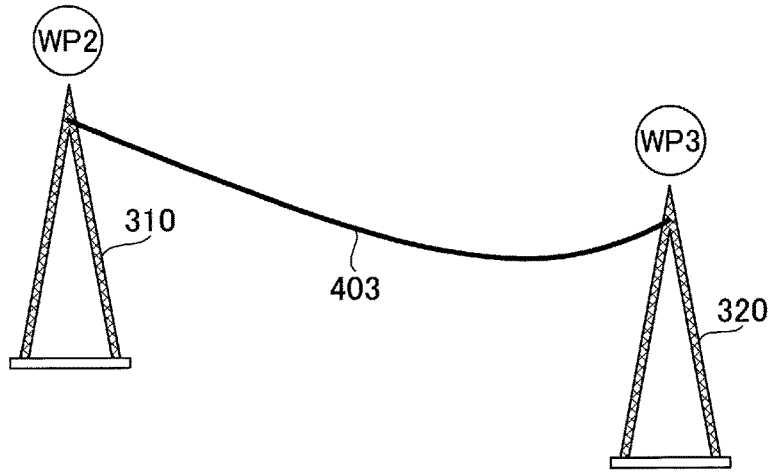
Figure 4D:
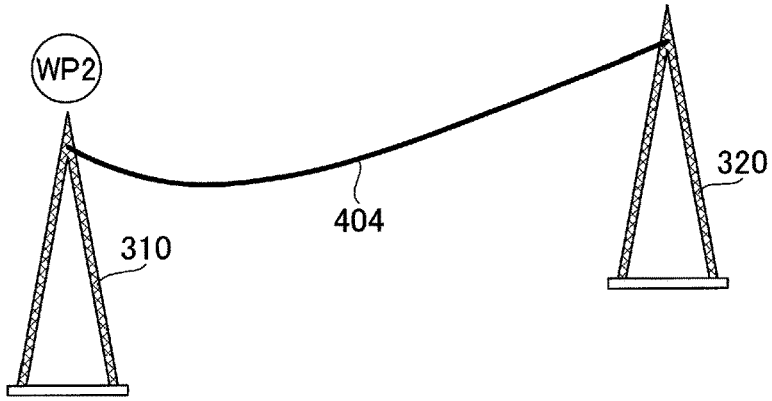

FIGS. 4C and 4D are used to describe a case where the power consumption during a flight between way points increases due to the shape of an object to be captured. In this case, although the distance between the pylon 310 and the pylon 320 in FIG. 4C is the same as that in FIG. 4D, power lines 403 and 404 stretched between the pylon 310 and the pylon 320 in FIGS. 4C and 4D have different shapes (symmetrical shapes). For this reason, in a flight between WP2 and WP3 in FIG. 4C, the distance of downward flight is longer than the distance of upward flight. On the other hand, in a flight between WP2 and WP3 in FIG. 4D, the distance of upward flight is longer than the distance of downward flight. As a result, the power consumption during the flight in FIG. 4D becomes greater than the power consumption during the flight in FIG. 4C.

Thus, even when way points are determined similarly, the flight distance and/or the power consumption during a flight may increase due to the shape of an object to be captured. As a result, the amount of remaining power may become less than or equal to a predetermined threshold during the flight, and the flight according to a flight plan may be interrupted as a failsafe operation. Although not illustrated in FIGS. 4A through 4D, the power consumption during a flight may also increase due to natural phenomena such as rain, snow, and head wind blowing in a direction opposite the flight direction of the unmanned aircraft 100.

<Flight Routes Taken when Flight According to Flight Plan is Interrupted>

When the amount of remaining power becomes less than or equal to a predetermined threshold during a flight according to a flight plan due to an increase in the flight distance or the power consumption, a failsafe operation is requested and the flight is interrupted. Flight routes taken in such a case are described here.

Figures 5A, 5B:
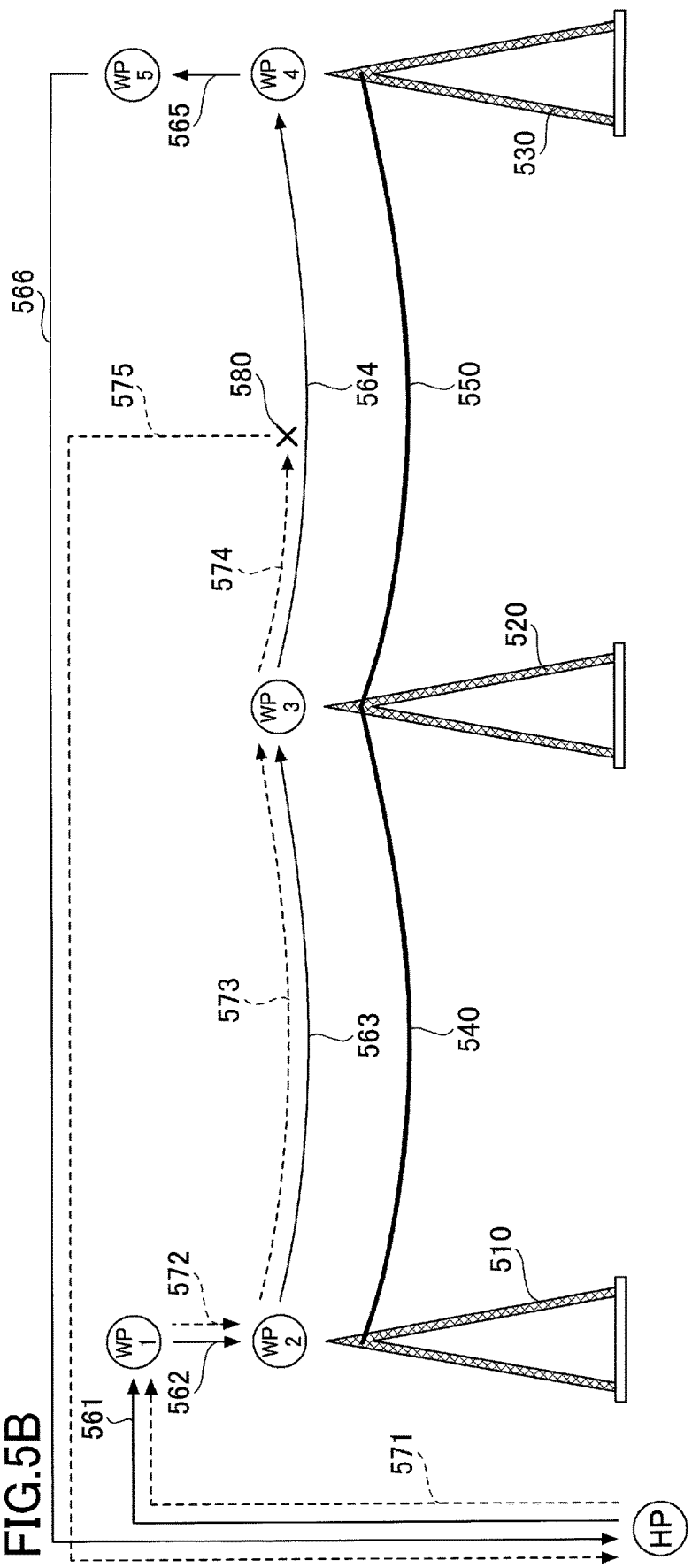
FIG. 5A is a table indicating an example of a flight plan.
FIG. 5B is a drawing illustrating way points and flight routes based on the flight plan of FIG. 5A, and actual flight routes.

FIG. 5A is a table indicating an exemplary flight plan 500. As indicated by FIG. 5A, the flight plan 500 includes five way points WP1 through WP5.

FIG. 5B illustrates the positions of way points included in the flight plan 500, flight routes (solid lines) based on the flight plan 500, and actual flight routes (dotted lines). In the example of FIG. 5B, WP1 is located above and at a predetermined distance from a pylon 510, and WP2 is located near the top of the pylon 510. Also in the example of FIG. 5B, WP3 is located near the top of a pylon 520, WP4 is located near the top of a pylon 530, and WP5 is located above and at a predetermined distance from the pylon 530.

As illustrated in FIG. 5B, according to the flight plan 500, the unmanned aircraft 100 flies from HP to WP1 (flight route 561), and descends to WP2 (flight route 562). Then, the unmanned aircraft 100 flies between WP2 and WP3 at a constant distance from a power line 540 (flight route 563). After passing WP3, the unmanned aircraft 100 further flies between WP3 and WP4 at a constant distance from a power line 550 (flight route 564). After reaching WP4, the unmanned aircraft 100 ascends to WP5 (flight route 565), and returns from WP5 to HP (flight route 566).

In FIG. 5B, it is assumed that the unmanned aircraft 100 actually flies as indicated by dotted lines 571 through 575. As indicated by the dotted lines 571 through 575, the unmanned aircraft 100 actually flies according to the flight plan 500 until the unmanned aircraft 100 passes WP3 (dotted lines 571 through 573). However, after passing WP3, the flight of the unmanned aircraft 100 according to the flight plan 500 is interrupted at a position 580, and the unmanned aircraft 100 returns from the position 580 to HP (dotted lines 574 and 575).

<Exemplary Flight Log Recorded when Flight According to Flight Plan is Interrupted>

Next, an exemplary flight log 600 is described with reference to FIG. 6. The flight log 600 is stored in the flight log storage 154 when a flight according to the flight plan 500 is interrupted.

As indicated by FIG. 6, the flight log 600 includes information items "point", "time", "latitude, longitude, altitude", "power", and "image data". The "point" stores a home position (HP) and way points (WP) in flight order. The "time" stores time information obtained by the flight controller 151 during the flight.

The "latitude, longitude, altitude" stores information indicating the coordinates (latitude, longitude, and altitude) of positions of the unmanned aircraft 100 that are obtained by the flight controller 151 at the corresponding times. The "power" stores information indicating states of the power supply 140 that are obtained by the power monitor 152 at the corresponding times. The "image data" stores, as one file (file name="IM1"), image data that is captured by the imaging controller 153 during the flight (from when the flight starts until a failsafe operation is requested).

In the example of FIG. 6, it is assumed that the amount of remaining power of the unmanned aircraft 100 became less than or equal to a predetermined threshold, a failsafe operation was requested, and the capturing of image data was interrupted at a position indicated by La100, Lo100, and Al100 (latitude, longitude, and altitude).

<Flight Plan Changing Method>

Next, a flight plan changing method is described based on an assumption that a changed flight plan is generated for the unmanned aircraft 100 that has returned to HP due to an interruption of a flight according to the flight plan 500. First, a changed flight plan generated according to a related-art flight plan changing method is described as a comparative example, and then a changed flight plan generated according to a flight plan changing method of the first embodiment is described.

Figures 7A, 7B:
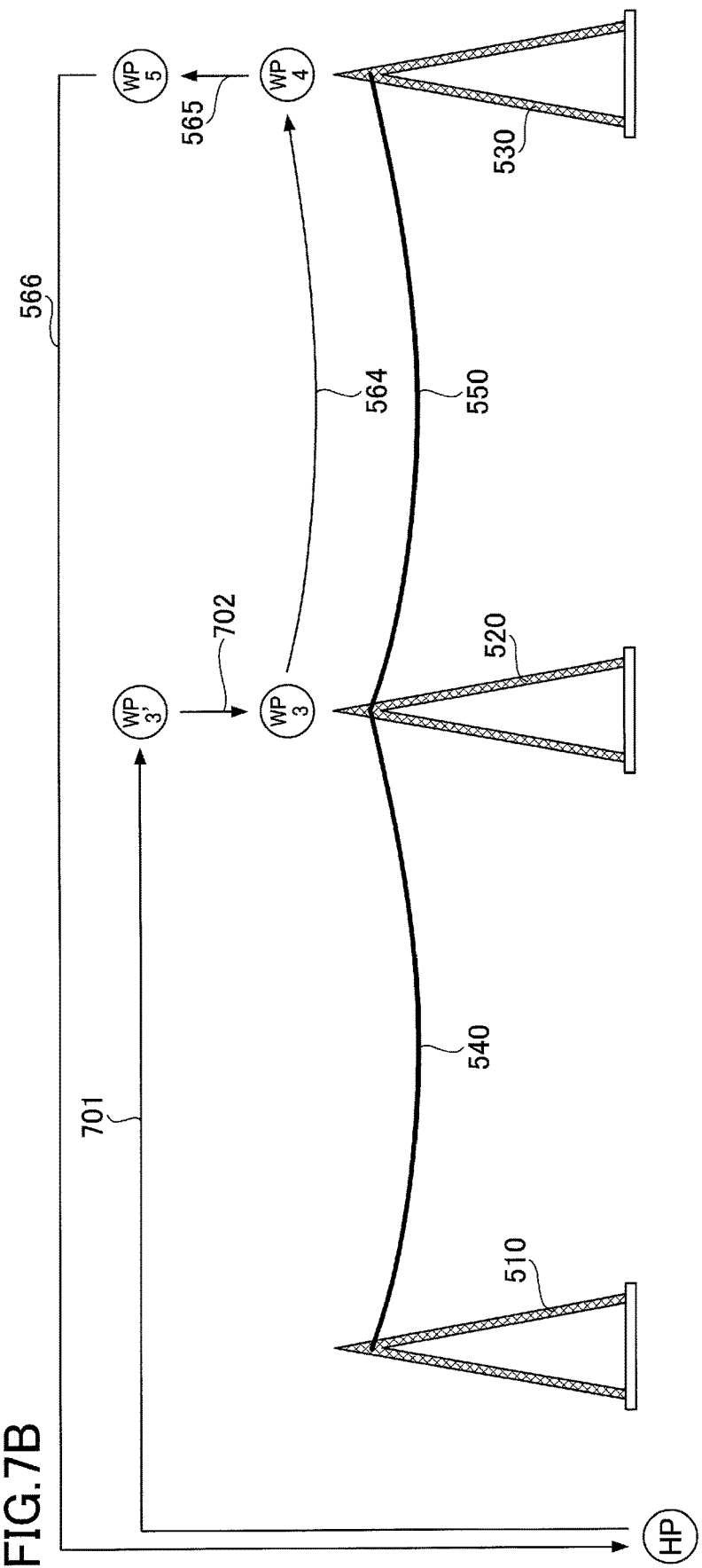
FIG. 7A is a table indicating an example of a changed flight plan generated according to a related-art flight plan changing method.
FIG. 7B is a drawing illustrating way points and flight routes based on the flight plan of FIG. 7A.

(1) Changed Flight Plan Generated According to Related-Art Flight Plan Changing Method FIG. 7A is a table indicating a changed flight plan 700 generated according to a related-art flight plan changing method. As indicated by FIG. 7A, the flight plan 700 generated according to the related-art flight plan changing method includes way points WP3 and WP4 located before and after the position 580 at which the flight according to the flight plan 500 is interrupted and unflown way points WP4 and WP5 (way points to which the unmanned aircraft 100 has not flown).

FIG. 7B illustrates the positions of way points included in the flight plan 700 and flight routes based on the flight plan 700. As illustrated in FIG. 7B, the unmanned aircraft 100 flies from HP to WP3' (flight route 701), and then descends to WP3 (flight route 702). Then, the unmanned aircraft 100 flies between WP3 and WP4 at a constant distance from the power line 550 (flight route 564). After reaching WP4, the unmanned aircraft 100 ascends to WP5 (flight route 565) and returns from WP5 to HP (flight route 566).

Thus, according to the related-art flight plan changing method, the unmanned aircraft 100 flies the flight routes 564 through 566. Here, a section of the flight route 564 between WP3 and the position 580 (see FIG. 5B) has already been flown in the flight based on the flight plan 500 (the dotted line 574 in FIG. 5B). Therefore, image data corresponding to the section between WP3 and the position 580 is captured twice. Accordingly, with the related-art flight plan changing method, compared with a case where the flight according to the flight plan 500 is not interrupted, the amount of captured image data increases, the time necessary to analyze the image data increases, and the inspection efficiency decreases.

(2) Changed Flight Plan Generated According to Flight Plan Changing Method of First Embodiment Next, a flight plan changing method according to the first embodiment is described. FIG. 8A is a table indicating a changed flight plan 800 generated according to a flight plan changing method of the first embodiment. As indicated by FIG. 8A, according to the flight plan changing method of the first embodiment, the position 580 at which the flight based on the flight plan 500 is interrupted is set as a new way point WP7, a position that is located above and at a predetermined distance from the position 580 is set as a new way point WP6, and the flight plan 800 including the new way points WP6 and WP7 and the unflown way points WP4 and WP5 is generated.

FIG. 8B illustrates the positions of way points included in the flight plan 800 and flight routes based on the flight plan 800. As illustrated in FIG. 8B, the unmanned aircraft 100 flies from HP to WP6' (flight route 801), and then descends to WP7 (flight route 802). Then, the unmanned aircraft 100 flies between WP7 and WP4 at a constant distance from the power line 550 (flight route 803). After reaching WP4, the unmanned aircraft 100 ascends to WP5 (flight route 565) and returns from WP5 to HP (flight route 566).

Thus, with the changed flight plan 800 generated according to the flight plan changing method of the first embodiment, the unmanned aircraft 100 does not have to fly the section between WP3 and the position 580 (see FIG. 5B). This makes it possible to prevent image data corresponding to the section between WP3 and the position 580 from being captured twice. Accordingly, even when a flight according to a flight plan is interrupted, the flight plan changing method of the first embodiment can prevent an increase in the amount of captured image data, prevent an increase in time necessary to analyze the image data, and improve the inspection efficiency.

<Functional Configuration of Flight Plan Management Apparatus>

Next, a functional configuration of a flight plan management apparatus 900 is described with reference to FIGS. 9A and 9B. The flight plan management apparatus 900, for example, generates a flight plan, sets the generated flight plan, analyzes a flight log, changes the flight plan, and sets the changed flight plan.

Figure 9A:
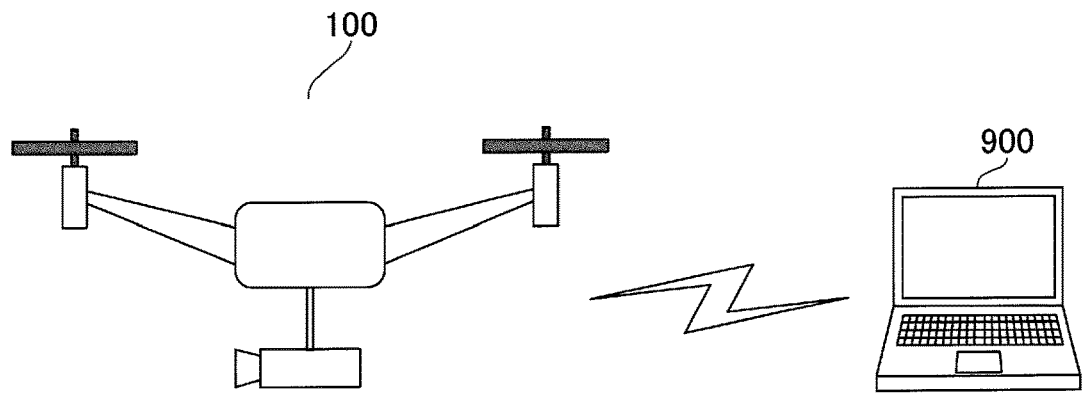
FIG. 9A is a drawing illustrating an unmanned aircraft and a flight plan management apparatus.

FIG. 9A illustrates a relationship between the unmanned aircraft 100 and the flight plan management apparatus 900. As illustrated in FIG. 9A, the flight plan management apparatus 900 is an external apparatus provided outside of the unmanned aircraft 100 and wirelessly communicates with the unmanned aircraft 100.

Figure 9B:
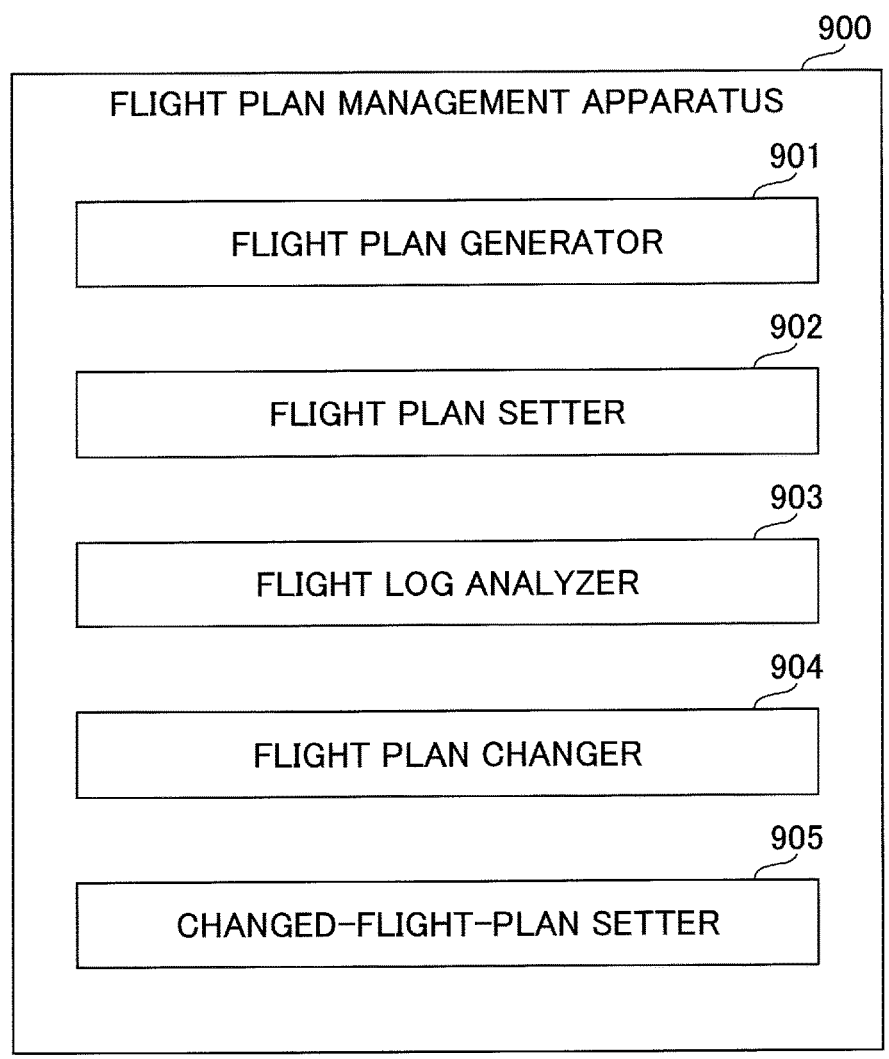
FIG. 9B is a drawing illustrating an example of a functional configuration of the flight plan management apparatus.

FIG. 9B is a drawing illustrating a functional configuration of the flight plan management apparatus 900. A flight plan management program is installed in the flight plan management apparatus 900. The flight plan management apparatus 900 executes the flight plan management program and thereby functions as a flight plan generator 901, a flight plan setter 902, a flight log analyzer 903, a flight plan changer 904, and a changed flight plan setter 905.

The flight plan generator 901 generates the flight plan 500. The flight plan setter 902 sets the flight plan 500 generated by the flight plan generator 901 in the flight controller 151 (see FIG. 1B).

The flight log analyzer 903 is an example of an identifier. The flight log analyzer 903 reads a flight log (e.g., flight log 600) stored in the flight log storage 154 (see FIG. 1B), and identifies actually-flown way points and unflown way points in the flight plan 500 based on the flight log. Also, based on the flight log 600, the flight log analyzer 903 identifies the coordinates (latitude, longitude, altitude) of the position 580 of the unmanned aircraft 100 at which a failsafe operation is requested and the capturing of image data by the imager 121 is interrupted.

The flight plan changer 904 is an example of a changer. The flight plan changer 904 generates a changed flight plan 800. As described above, the changed flight plan 800 includes the way point WP7 corresponding to the position identified by the flight log analyzer 903 (i.e., the position 580 at which the flight plan 500 is interrupted), the way point WP6 that is located above and at a predetermined distance from the position 580, and the unflown way points WP4 and WP5. The changed flight plan setter 905 sets the changed flight plan 800 generated by the flight plan changer 904 in the flight controller 151.

<Hardware Configuration of Flight Plan Management Apparatus>

Figure 10:
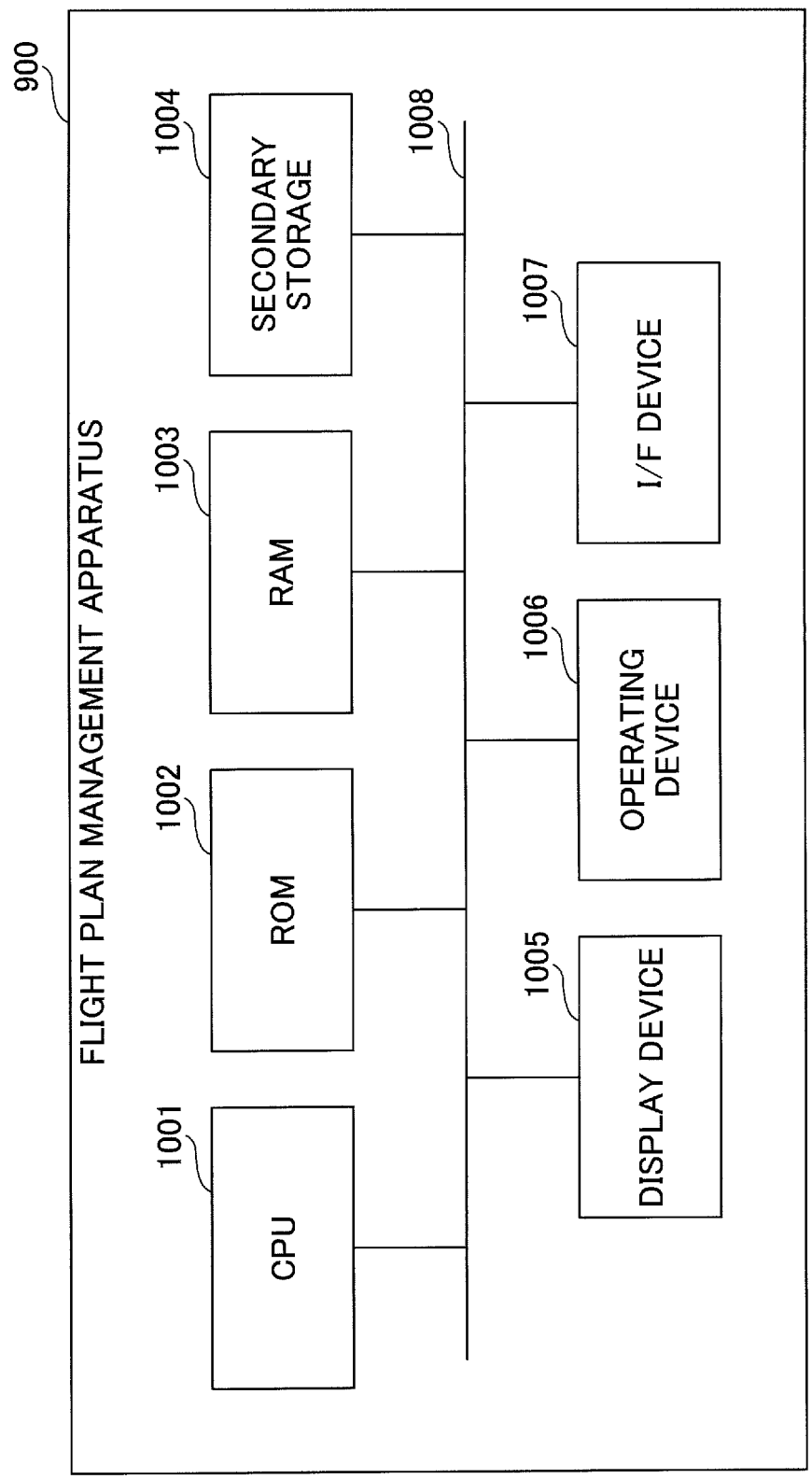
FIG. 10 is a block diagram illustrating an example of a hardware configuration of the flight plan management apparatus.

Next, a hardware configuration of the flight plan management apparatus 900 is described. FIG. 10 is a block diagram illustrating an example of a hardware configuration of the flight plan management apparatus 900. As illustrated in FIG. 10, the flight plan management apparatus 900 includes a CPU 1001, a ROM 1002, a RAM 1003, a secondary storage 1004, a display device 1005, an operating device 1006, and an I/F device 1007. These components of the flight plan management apparatus 900 are connected to each other via a bus 1008.

The CPU 1001 executes various programs (e.g., a flight plan management program) installed in the secondary storage 1004. The ROM 1002 is a nonvolatile memory and functions as a main memory storing various programs and data that are necessary for the CPU 1001 to execute the programs installed in the secondary storage 1004. The RAM 1003 is a volatile memory such as a DRAM or an SRAM and functions as a main memory that provides a work area into which the programs installed in the secondary storage 1004 are loaded when executed by the CPU 1001.

The secondary storage 1004 is a secondary memory that stores various programs and information used when the programs are executed. The display device 1005 is an output device that displays, for example, internal states of the flight plan management apparatus 900. The operating device 1006 is an input device for inputting various instructions to the flight plan management apparatus 900. The I/F device 1007 is a connection device for communications with the unmanned aircraft 100.

<Flight Plan Changing Process>

Figure 11:
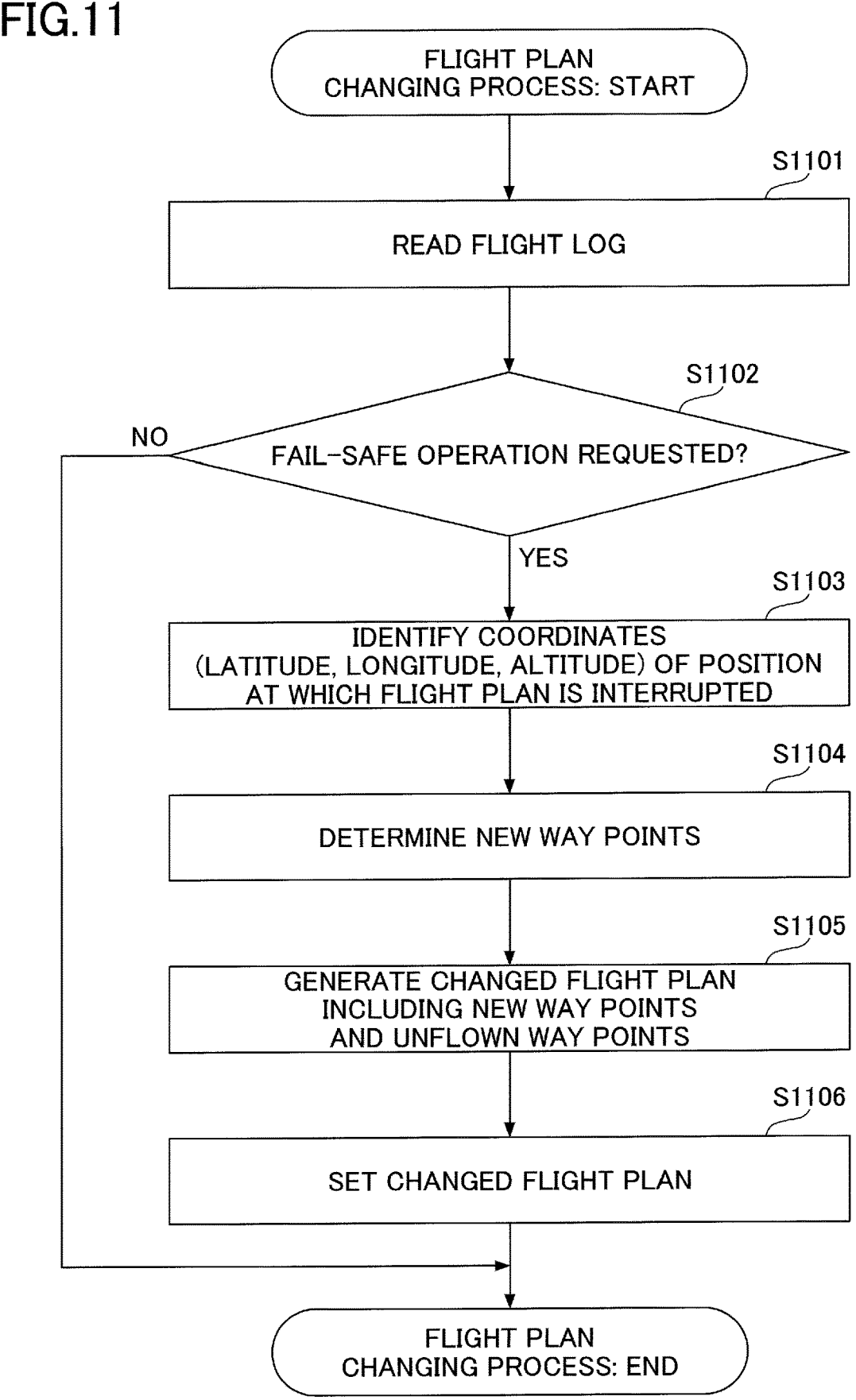
FIG. 11 is a flowchart illustrating a flight plan changing process.

Next, a flight plan changing process performed by the flight plan management apparatus 900 is described. FIG. 11 is a flowchart illustrating a flight plan changing process. When the unmanned aircraft 100, in which the flight plan 500 is set, starts a flight from HP and returns to HP, the flight plan management apparatus 900 wirelessly connects to the unmanned aircraft 100 and starts the process illustrated by FIG. 11.

At step S1101, the flight log analyzer 903 reads the flight log 600 from the flight log storage 154. At step S1102, the flight log analyzer 903 determines whether the amount of remaining power became less than or equal to a predetermined threshold and a failsafe operation was requested during the flight. When it is determined at step S1102 that the failsafe operation was not requested (NO at step S1102), the flight plan changing process ends.

When it is determined at step S1102 that the failsafe operation was requested (YES at step S1102), the flight plan changing process proceeds to step S1103. At step S1103, based on the read flight log 600, the flight log analyzer 903 identifies the coordinates (latitude, longitude, altitude) of the position 580 of the unmanned aircraft 100 at which the failsafe operation was requested and the capturing of image data by the imager 121 was interrupted.

At step S1104, the flight plan changer 904 determines new way points. Specifically, the flight plan changer 904 determines the identified position 580 and a position located above and at a predetermined distance from the position 580 as new way points.

At step S1105, the flight plan changer 904 generates, as a changed flight plan, the flight plan 800 that includes the determined new way points and unflown way points.

At step S1106, the changed flight plan setter 905 sets the generated flight plan 800 in the flight controller 151. Then, the flight plan changing process ends.

<Flight Log of Flight According to Changed Flight Plan>

Next, a flight log 1200 of a flight of the unmanned aircraft 100 according to the changed flight plan 800 set by the changed flight plan setter 905 is described with reference to FIG. 12.

As indicated by FIG. 12, according to the flight log 1200, the unmanned aircraft 100 started the flight from HP, passed WP6, WP7, WP4, and WP5, and returned to HP. Accordingly, any portion of image data with a file name "IM2" does not overlap the image data with the file name "IM1" that was captured during the flight according to the original flight plan 500.

SUMMARY

As described above, the flight plan changing method of the first embodiment includes reading a flight log from an unmanned aircraft that flies flight routes connecting multiple way points included in a flight plan and captures image data of an object located between the way points; identifying coordinates of a position of the unmanned aircraft at which the capturing of the image data of the object is interrupted; and generating a changed flight plan including way points that are newly determined based on the identified coordinates of the position.

Thus, even when a flight according to a flight plan is interrupted, the flight plan changing method of the first embodiment can prevent image data of the same portion of an object from being repeatedly captured, thereby prevent an increase in the amount of captured image data, and prevent an increase in time necessary to analyze the image data. That is, the flight plan changing method of the first embodiment can generate a flight plan that can improve the inspection efficiency.

Second Embodiment

In the first embodiment, the flight plan management apparatus 900 is provided outside of the unmanned aircraft 100 as an external apparatus. However, in a second embodiment, all or some of the functions (the flight plan generator 901 through the changed flight plan setter 905) of the flight plan management apparatus 900 may be implemented by the control device 150 of the unmanned aircraft 100.

Also in the first embodiment, the flight plan management apparatus 900 includes the flight plan generator 901, the flight plan setter 902, the flight log analyzer 903, the flight plan changer 904, and the changed flight plan setter 905. However, these functions of the flight plan management apparatus 900 may be implemented by multiple apparatuses. For example, these functions of the flight plan management apparatus 900 may be implemented by a flight plan generating apparatus including the flight plan generator 901 and the flight plan setter 902, and a flight plan changing apparatus including the flight log analyzer 903, the flight plan changer 904, and the changed flight plan setter 905.

OTHER EMBODIMENTS

In the first and second embodiments, the position 580 of the unmanned aircraft 100, at which a failsafe operation is requested and the capturing of image data by the imager 121 is interrupted, is determined as a new way point. However, a new way point may also be determined in a different manner. For example, a position near the position 580 may be determined as a new way point.

Also in the first and second embodiments, the position 580 of the unmanned aircraft 100 is described as a position at which the capturing of image data by the imager 121 is interrupted. Here, the capturing of image data by the imager 121 is interrupted when a failsafe operation is requested. Therefore, the position 580 of the unmanned aircraft 100 may be defined as a position at which a failsafe operation is requested. Also, the position 580 may be defined as a position at which the amount of remaining power that can be supplied becomes less than or equal to a predetermined threshold. Further, the position 580 may be defined as a position at which a failsafe operation is requested and a flight according to the flight plan 500 is interrupted.

In the first and second embodiments, a failsafe operation is requested when the amount of remaining power becomes less than or equal to a predetermined threshold. However, a failsafe operation may be requested in response to other events.

In the first and second embodiments, a power line stretched between pylons is used as an example of an object. However, any other object at a high altitude may be inspected using the unmanned aircraft 100.

In the first and second embodiments, the capturing of image data is started when a flight starts and is stopped when the flight ends. However, the capturing of image data may be started and stopped at other timings. For example, the capturing of image data may be started when the unmanned aircraft 100 reaches WP2 or WP7 and stopped when the unmanned aircraft 100 reaches WP4.

A flight plan changing method and a flight plan changing apparatus according to embodiments of the present invention are described above. However, the present invention is not limited to the specifically disclosed embodiments, and variations and modifications may be made without departing from the scope of the present invention.

What is claimed is:

1. A flight plan changing method performed by an apparatus, the flight plan changing method comprising:
   reading a flight log of an unmanned aircraft that has started a flight from a home position and has flown flight routes connecting multiple way points included in an original flight plan to capture image data of an object located between the way points;
   identifying, based on the flight log, coordinates of a position of the unmanned aircraft at which the capturing of the image data of the object is interrupted;
   generating a changed flight plan including way points that are newly determined based on the identified coordinates of the position, the newly-determined way points including an interrupted way point corresponding to the coordinates of the position of the unmanned aircraft at which the capturing of the image data of the object is interrupted; and setting the generated changed flight plan in a flight controller of the unmanned aircraft, wherein the changed flight plan includes the home position, the newly-determined way points, and unflown way points in the original flight plan that have not been passed by the unmanned aircraft according to the flight log;

a flight route included in the changed flight plan and defining a route from the home position to the interrupted way point does not include flown way points in the original flight plan that have been passed by the unmanned aircraft according to the flight log; and the newly-determined way points further include a way point that is located approximately directly above the interrupted way point and to which the unmanned aircraft flies immediately prior to flying to the interrupted waypoint.

2. The flight plan changing method as claimed in claim 1, wherein the capturing of the image data of the object is interrupted when an amount of remaining power of the unmanned aircraft becomes less than or equal to a predetermined threshold and a failsafe operation is requested.

3. A flight plan changing apparatus, comprising:

a processor programmed to execute a process including reading a flight log of an unmanned aircraft that has started a flight from a home position and has flown flight routes connecting multiple way points included in an original flight plan to capture image data of an object located between the way points;

identifying, based on the flight log, coordinates of a position of the unmanned aircraft at which the capturing of the image data of the object is interrupted;

generating a changed flight plan including way points that are newly determined based on the identified coordinates of the position, the newly-determined way points including an interrupted way point corresponding to the coordinates of the position of the unmanned aircraft at which the capturing of the image data of the object is interrupted; and setting the generated changed flight plan in a flight controller of the unmanned aircraft, wherein the changed flight plan includes the home position, the newly-determined way points, and unflown way points in the original flight plan that have not been passed by the unmanned aircraft according to the flight log;

a flight route included in the changed flight plan and defining a route from the home position to the interrupted way point does not include flown way points in the original flight plan that have been passed by the unmanned aircraft according to the flight log; and the newly-determined way points further include a way point that is located approximately directly above the interrupted way point and to which the unmanned aircraft flies immediately prior to flying to the interrupted waypoint.

* * * * *